May 26, 1942.                J. S. PARKES                2,284,538
                           HEADLAMP MOUNTING
                          Filed Aug. 17, 1940            3 Sheets-Sheet 1
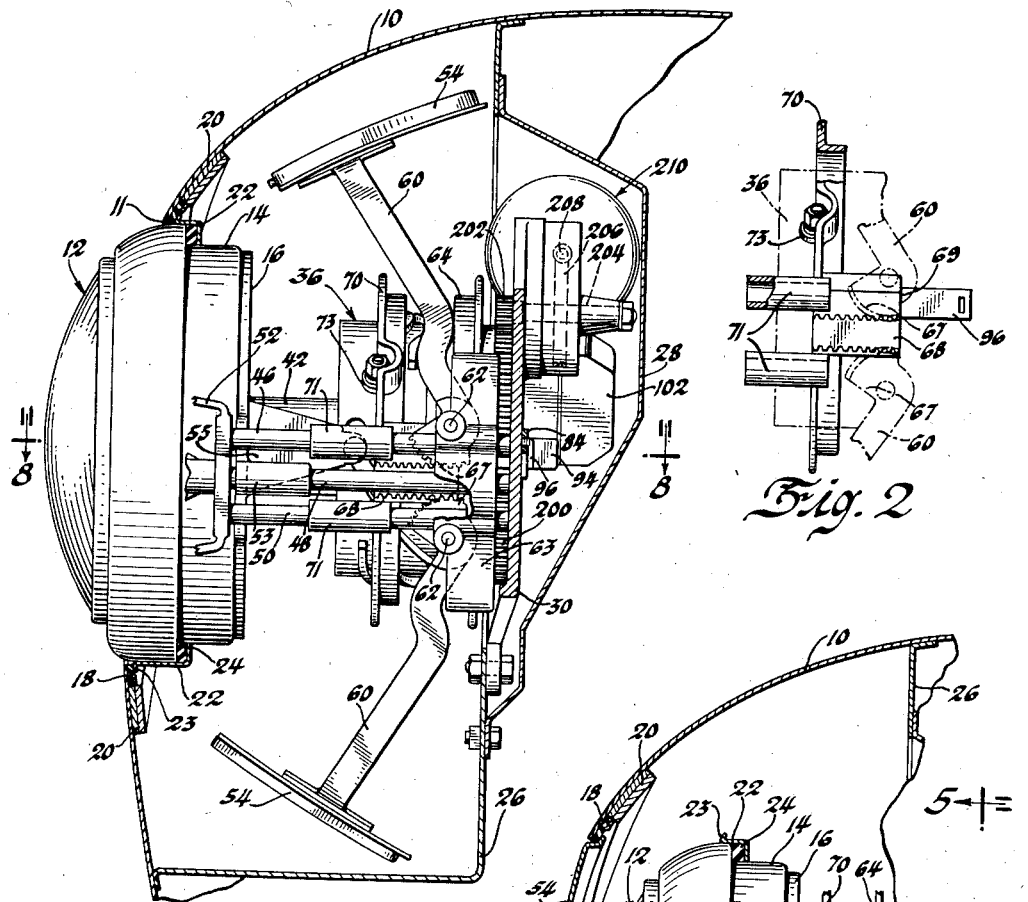
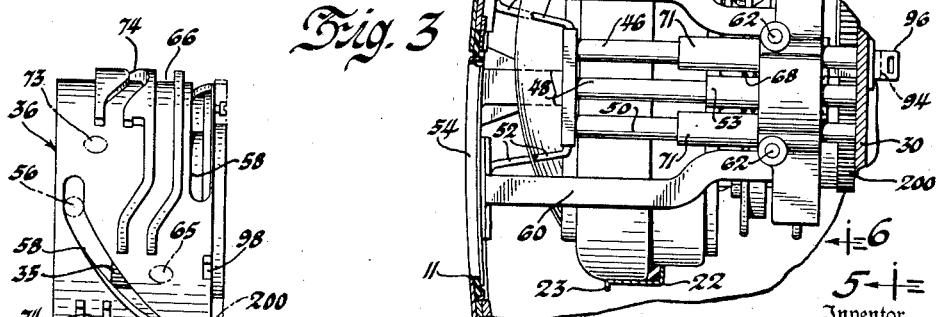
Inventor
John S. Parkes
Blackmore, Spencer & Flint
Attorneys May 26, 1942.  J. S. PARKES  2,284,538
HEADLAMP MOUNTING
Filed Aug. 17, 1940   3 Sheets-Sheet 2

Inventor
John S. Parkes
By
Blackmore, Spencer & Hurt
Attorneys

May 26, 1942.  J. S. PARKES  2,284,538
HEADLAMP MOUNTING
Filed Aug. 17, 1940   3 Sheets-Sheet 3
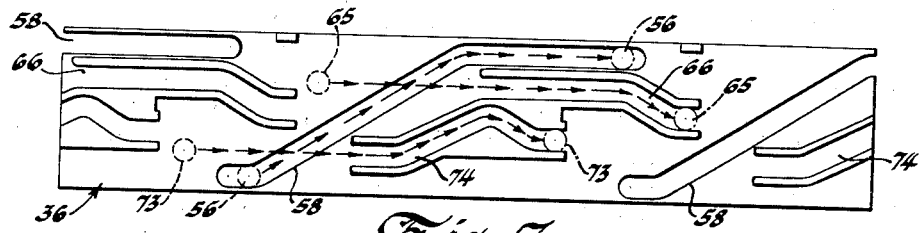
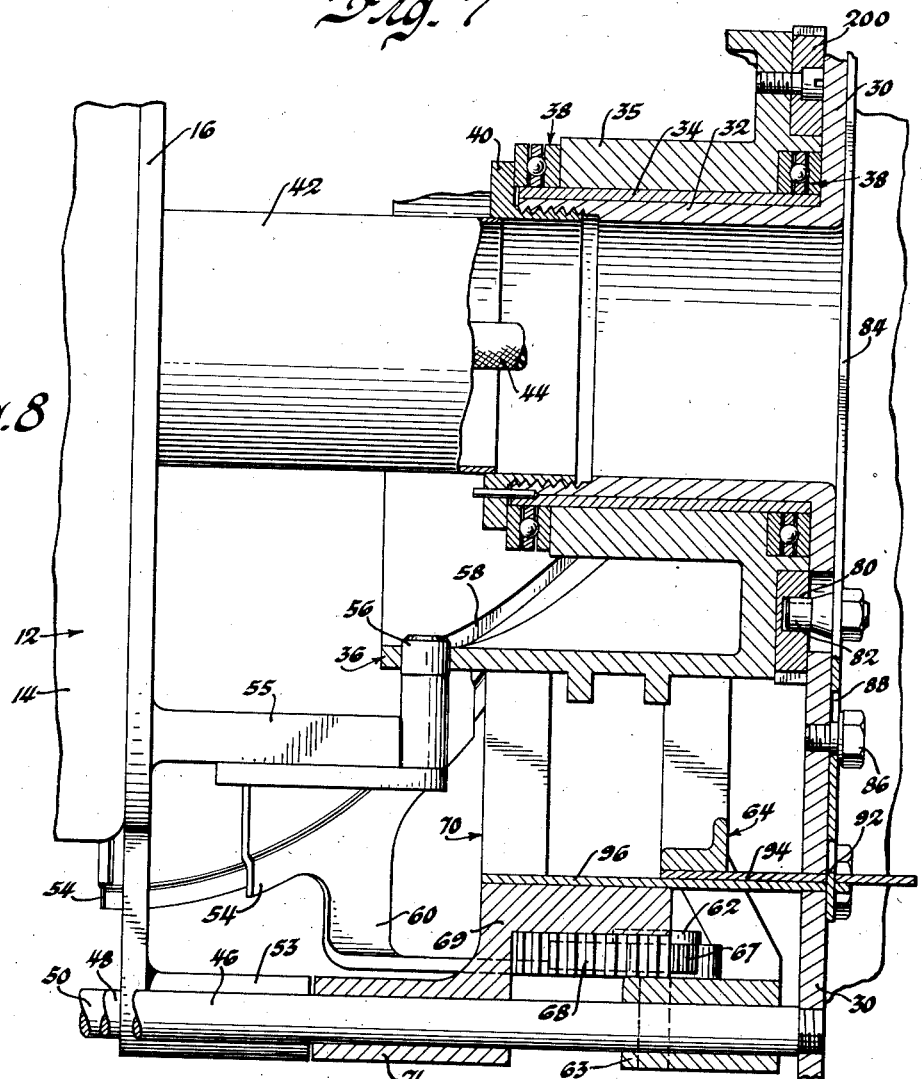
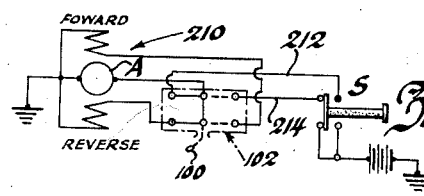

Patented May 26, 1942

2,284,538

UNITED STATES PATENT OFFICE 2,284,538

HEAD-LAMP MOUNTING

John S. Parkes, Birmingham, Mich., assignor to General Motors Corporation, Detroit, Mich., a corporation of Delaware Application August 17, 1940, Serial No. 352,998

8 Claims. (Cl. 240—7.1)

This invention has to do with a headlamp mounting for automobiles permitting the headlamp to be retracted and concealed within the body or fender when not in use. Such arrangements have the advantage that when driving in the daytime there are no projecting lamp parts to increase wind resistance and reduce the vehicle speed. Furthermore since the headlamps are most of the time concealed, body design need no longer be hampered by the requirements of the headlamp mounting and more attractive designs may be employed.

One of the problems in designing such mountings is that of providing a good seal, for the retracting mechanism may be put out of action by the entrance of dust and moisture. A special problem is created in winter when moisture is likely to collect in the apparatus or between the lamp or the lamp shutter and the body or fender and freeze parts together. An important feature of this invention consists in the provision of means for melting any ice that may interfere with operation of the mechanism.

According to my invention the opening for the headlamp is normally closed by a shutter or shutters which are moved into tight sealing engagement with the periphery of the opening during the latter part of the cycle of operation in retracting the lamp. Similarly when the headlamps are advanced to working position, during the latter part of the cycle the lamps are moved forwardly into tight sealing engagement with the edges of the opening. Thus a good seal is provided under all conditions. The headlamps are preferably mounted for sliding movement only in a direction parallel to the car axis. With this arrangement advancing or retracting the headlamp does not change its aim. A further important advantage resulting from this construction is that when the headlamps are in retracted position they may be turned on and the heat of the beam playing on the closed shutters is sufficient to melt any ice which may have collected in the joint between the shutters and the opening in the body or fender. The increased temperature is also sufficient to melt any ice that may have collected on the operating mechanism. Thus free operation of the mechanism is insured under even the most unfavorable weather conditions.

Another improvement consists in the employment of a two part shutter, preferably opening centrally, thereby reducing the space required for housing the shutter and its operating mechanism. The operating mechanism is also characterized by compactness and freedom from looseness or rattling of parts.

Various other features and advantages of the invention will be pointed out in the course of the following description.

In the drawings:

Figure 1 is a side elevation of the headlamp and its mounting with parts in section.

Figure 2 is a side elevation partly in section showing the yoke carrying the rack for swinging the pivoted shutters.

Figure 3 is a fragmentary view corresponding to Figure 1 but showing the headlamp retracted and the shutters in closed position.

Figure 4 is a side elevation of the drum cam.

Figure 7 is a developed view of the cam tracks on the periphery of the drum cam.

Figure 8 is a fragmentary section on line 8—8 of Figure 1.

Figure 9 is a diagrammatic view of a circuit which may be employed to actuate the headlamps, the parts being shown in the position they occupy with the lamp retracted.

Figure 5:
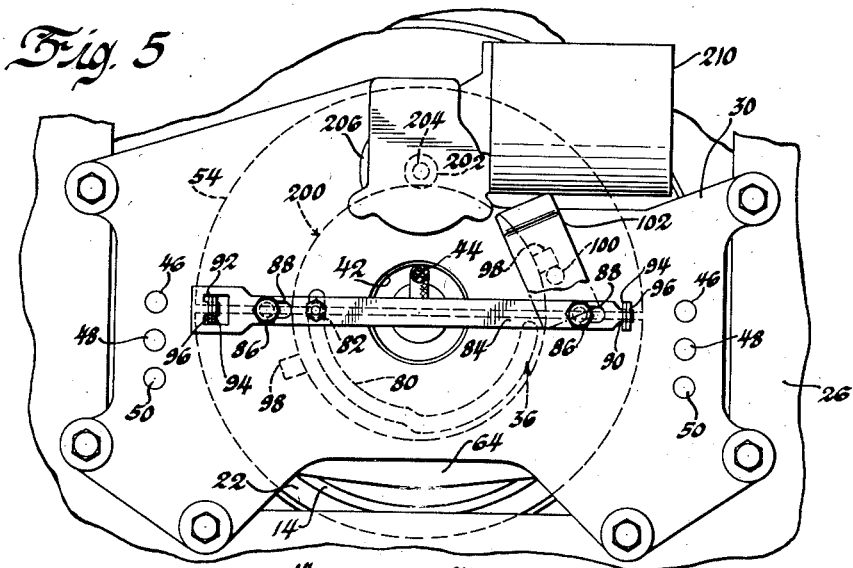
Figure 5 is a fragmentary elevation taken substantially on line 5—5 of Figure 3.

10 indicates a portion of an automobile body or fender having an opening 11 in which the headlamp 12 may be exposed for use, as shown in Figure 1. When the headlamp is retracted the opening is closed by shutters 54 as shown in Figure 3. The headlamp may be of the well known type consisting of a lens and a reflector equipped with a light source, the lens and reflector being sealed together so as to exclude dust and moisture. Headlamp 12 is preferably mounted in a suitable housing 14 to the rear of which is secured plate 16. About the opening 11 is arranged a gasket 18 of rubber or other yieldable material together with suitable reinforcing rings 20 to stiffen the construction and maintain the shape of the fender or body around the opening. 22 indicates a sealing ring secured about the housing 14 and having forwardly and outwardly projecting flange 23 adapted to have sealing engagement with gasket 18 when the headlamp is in position for use as shown in Figure 1. A suitable gasket 24 is interposed between the sealing ring 22 and the housing 14 as a further guard against the entrance of dust and moisture into the chamber containing the lamp retracting mechanism. This chamber is constituted by housings 26 and 28, the latter of which forms an extension of the former and is secured to it. Housing 26 is preferably welded to the fender or body 10. It is especially important that the chamber containing the operating mechanism be well sealed and to insure this gaskets may be provided at the joints as desired.

Part 30, best shown in Figures 1 and 5, is the main supporting bracket secured to the housing 26 and lying within the housing 28. Support 30 is provided with an integral tubular spindle 32 provided with bearing sleeve 34 on which is journalled hub 35 of drum cam 36. Thrust bearing 38 is interposed between one end of hub 35 and bracket 30 and a similar thrust bearing 38 is provided between the other end of hub 35 and collar 40 threaded in the end of tubular spindle 32. 42 indicates a sleeve, preferably of sheet metal, secured to the lamp housing 14 and extending through a central aperture in plate 16. Sleeve 42 has sliding engagement with the interior of collar 40 and serves as a conduit for the passage of cable 44 supplying current to the headlamp and to some extent as a guide for the headlamp as it is projected or retracted. The circuit for operating the headlamps is not illustrated as it is conventional, including the usual dash switch to turn the lamps on or off and the foot switch to lower the beam.

Drum cam 36 is rotated in either direction as desired by reversible motor 210, Figure 1, by means of the following gearing: to one end of drum cam 36 is bolted ring gear 200 driven by spur gear 202 on shaft 204 carrying worm wheel 206 driven by worm 208 on the shaft of motor 210. The motor and gearing for driving the drum cam are suitably supported on plate 30 as shown.

The mechanism for supporting the headlamp and shutters and for moving them in the desired sequence by means of drum cam 36 will now be described. This mechanism is duplicated at the opposite sides of the headlamp but for the most part the description of the arrangement at one side only will suffice. For convenience in explanation but one set of cam followers is indicated in the developed view of cam drum 36 shown in Figure 7. It will be understood that a duplicate set cooperates with the other set of cam grooves.

46, 48 and 50 indicate guide rods having their rear ends threaded or otherwise suitably secured in bracket 30 and their forward ends secured in brackets 52, Figures 1 and 3, secured to the reinforcing rings 20 at the sides of the opening 11. The two sets of guide rods constitute the principal supporting means for the headlamp 12 and the shutters 54.

Figure 6:
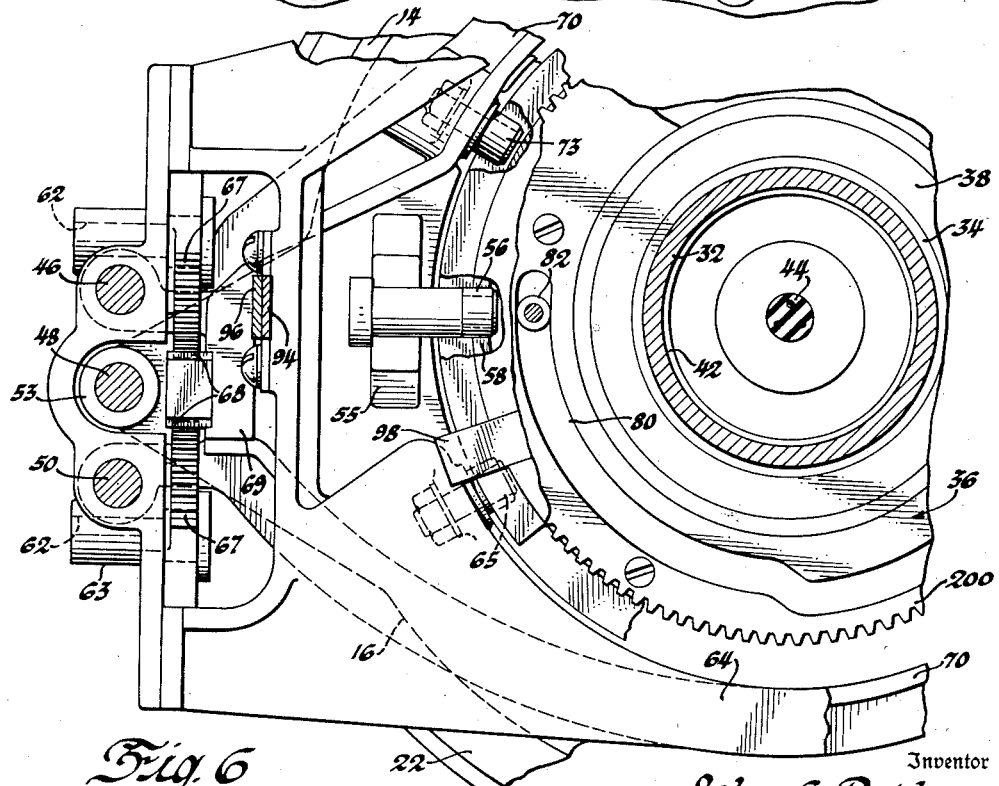
Figure 6 is a fragmentary elevation with parts in section taken substantially on line 6—6 of Figure 3.

Headlamp 12 is supported from the center guide rods 48 by means of sleeves 53 encircling the guide rods and formed integrally with plate 16 carrying the headlamp. As best shown in Figures 6 and 8, lamp supporting plate 16 is also provided with rearwardly extending brackets 55 carrying roller equipped cam followers 56 which engage tracks 58 in drum cam 36. In the case of this as well as the other cam followers but one is shown, the other occupying a diametrically opposed position on the other side of the drum cam. By reference to Figure 7, which is a developed view of the cam tracks on the drum 36, it will be apparent that as the drum cam is rotated cam followers 56 and with them the headlamp will be moved by the cam track 58 forwardly or rearwardly from opening 11.

The mechanism for operating the shutters 54 will now be described. Shutters 54 are carried by U-shaped levers 60 pivoted at 62 on crossheads 63 carried by yoke 64 slidably mounted at opposite sides on guide rods 46 and 50 as best shown in Figure 6. Yoke 64 carries projecting roller-equipped cam followers 65 cooperating with tracks 66 on drum cam 36 for a purpose later to be described. But one of the cam followers 65 is shown on the drawings, the other being located diametrically opposite it. Levers 60 carry at their inner ends gear segments 67 meshing with racks 68 formed integrally back to back on arms 69 extending rearwardly from yoke 70 slidably mounted at opposite sides on guide rods 46 and 50 by means of integral sleeves or crossheads 71. Yoke 70 carries roller-equipped cam followers 73 cooperating with cam tracks 74 on the drum cam.

It will now be apparent that as yoke 70 is moved rearwardly by engagement of cam followers 73 with cam track 74 racks 68 carried by the yoke engage gear segments 67 and rock the levers 60 carrying shutters 54 to closed position. Following this the simultaneous engagement of cam followers 65 with the inclined portion of cam tracks 66 and the engagement of cam followers 73 with the similarly inclined portions of cam tracks 74 moves yokes 64 and 70 forward simultaneously causing the closed shutters to be moved forward into opening 11 until the edges of the shutters engage gasket 18 as shown in Figure 3.

It is desirable to provide means to lock the shutters in open position for during the greater part of the portion of the cycle in which they are open cam followers 65 and 73 are out of engagement with their respective cam tracks so there is nothing to restrain them from accidental movement. To accomplish this the rear end of drum cam 36 is provided with cam track 80, as best shown in Figures 5 and 8, in which is received the roller equipped cam follower 82 carried by locking bar 84 mounted for transverse sliding movement on studs 86 secured in the plate 30 and engaging slots 88 in the bar. Bar 84 is provided at one end with locking tongue 90 and at the other end with locking tongue 92. Projecting rearwardly from yoke 64 is apertured lug 94, best shown in Figures 3 and 8, and projecting rearwardly from yoke 70 is apertured lug 96, best shown in Figures 2 and 8. When the apertures in lugs 94 and 96 are aligned as shown in Figure 8 they are adapted to be engaged by locking tongue 92, the locking movement being accomplished by engagement of cam follower 82 with cam track 80 as will be evident from Figures 5 and 6.

Locking tongue 90 similarly engages apertured lugs 94 and 96 secured to diametrically opposite sides of yokes 64 and 70.

The circuit shown in Figure 9 consists of a simple push-pull switch S in series with limit switch 102 having an actuating knob 100 adapted to be engaged by one or the other of lugs 98 as the cam drum reaches the end of its movement in either direction. If it is desired to retract the headlamps, switch S is moved to the right whereupon current is supplied to the armature A and the reverse field through lead 212. This sets in operation the retracting cycle to be later described at the end of which one of the lugs 98 engages knob 100 and trips switch 102 to the position shown in dotted lines. If now switch S is moved to the position shown in full lines in Figure 9 current is supplied through lead 214 to the armature A and forward field of motor 210, thereby advancing the lamp to operative position as will be described.

The operation of the device will now be described in detail. With the parts in the position shown in Figure 1, should it be desired to retract the headlamps the driver closes the circuit of motor 210 by moving switch S to the right as previously described, Figure 9, thereby rotating drum cam 36 through worm 208, worm gear 206, spur gear 202 and ring gear 200. The effect of this is to move the drum so that while at the beginning of the stroke the cam followers 56, 65 and 73 occupy the positions indicated by dotted lines at the left of Figure 7, at the end of the stroke they occupy the positions indicated at the right of that figure. It will be noted that for convenience in illustration the convention has been adopted that the cam followers rotate with respect to the cam tracks in Figure 7 whereas in fact the cam tracks rotate while the cam followers are confined for movement in the direction of the axis of the drum.

During the first part of the movement the cam followers 56 move along the inclined portion of cam tracks 58 thereby retracting the headlamp 12. When this retraction has been partially completed the cam track 80 in the end of the drum cam actuates cam follower 82 to move latch 84 so as to disengage tongues 90 and 92 from the apertures in lugs 94 and 96 secured to yokes 64 and 70 respectively thereby unlocking the shutters 54. This does not take place until cam followers 73 and 65 have engaged their respective cam tracks 74 and 66 thereby restraining the shutters from chance movement. Shortly thereafter cam followers 73 engage the inclined portions of cam tracks 74 thereby causing racks 68 to rotate gear segments 67 of levers 60 carrying the shutters 54 so that the shutters are now moved into closed position between the retracted headlamp and the opening. Next the cam followers 73 and 65 engage the oppositely inclined portions of the cam tracks 74 and 66 thereby advancing the shutters to the position shown in Figure 3. At the conclusion of this movement all of the cam followers are in engagement with their respective tracks so that there is no opportunity for displacement of the parts as the result of jolting or vibration so it is unnecessary to provide special means to lock the parts in this position. As the cycle reaches its end one of the lugs 98 engages projection 100 of switch 102 so as to cut off the supply of current to armature A of motor 210 and its reverse field and establish connection for the supply of current to the armature and forward field when switch S is next actuated.

In advancing the headlamp from the position shown in Figure 3 to that shown in Figure 1 the action is reversed. Switch S is moved to the position shown in full lines in Figure 9 causing motor 210 to rotate in the opposite direction. The first thing that takes place is retraction of the shutters 54 followed by the swinging of them to open position and the simultaneous advancing of the headlamp toward the projected position shown in Figure 1. Near the end of the movement one of the lugs 98 moves limit switch 102 back to the position shown in Figure 9, thereby breaking the motor circuit. The parts are now in position for retraction of the lamps upon moving switch S to the right.

An important feature of my invention is the provision for forward movement of the shutters or headlamps toward the end of each cycle so that they may be tightly engaged with the opening in the body or fender so as to produce a good seal. This is particularly important in winter when any moisture collecting in the device is likely to freeze and interfere with its operation. Should ice form between the shutters and the opening 11 holding them in closed position, it is only necessary to turn on the headlamps and the heat from the beams will soon melt the ice and free the shutters.

The invention is susceptible of considerable modification. If desired cam followers need be provided at one side only of a headlamp. However to insure complete freedom from binding, a duplication of the operating mechanism on the other side is desirable.

It will be understood the same mechanism is provided for each headlamp and common switching means for the motors 210 is all that is required to produce simultaneous operation. It will be apparent also that should one of the devices fail to operate the other will function without hindrance.

Other mechanical movements which are the equivalent of those illustrated may be employed, and such equivalents are within the scope of my invention as indicated by the accompanying claims.

I claim:

1. A retractible lamp mounting for vehicles for enabling the lamp to be exposed when desired in an opening in a suitable support on the vehicle comprising in combination with said lamp, means for guiding the lamp for substantially straight-line movement toward or from the opening, a shutter support mounted for sliding movement parallel to the direction of movement of the lamp, a shutter pivoted to said support for movement toward or from the opening at an angle to the path of movement of the lamp, and means for moving the lamp, shutter support and shutter in sequence to slide the shutter support and shutter away from the opening, swing the shutter out of the path of movement of the lamp, and advance the lamp into the opening or reverse said operations.

2. A retractible lamp mounting for vehicles for enabling the lamp to be exposed when desired in an opening in a suitable support comprising means for movably mounting the lamp for sliding movement so as to enable it to be operatively positioned in said opening or withdrawn rearwardly therefrom, a plurality of pivoted closures adapted to be swung toward each other to cooperate in closing said opening or to be swung away from each other out of the path of the lamp, means for mounting said closures for sliding movement rearwardly of the opening, and operator controlled means operating in sequence to slide said lamp away from said opening, swing said closures into position covering said opening, and move said closures forward to close said opening or to reverse said sequence when desired.

3. A retractible mounting for automobile lamps and the like comprising guiding means, a lamp support slidably mounted on the guiding means, a shutter support slidably mounted on said guiding means, a shutter pivoted on said support, a shutter operator slidably mounted on said guiding means and operatively connected to said shutter to cause the shutter to swing upon relative movement of said shutter support and shutter operator, and operator controlled means adapted to actuate said lamp support, shutter support and shutter operator in sequence so as to move said shutter support, shutter and shutter operator rearwardly, then move said shutter operator relatively to said shutter support to cause said shutter to move out of the path of travel of said lamp and then advance said lamp to projected position or to reverse said sequence of operations as desired.

4. In the combination as defined in claim 3, a latch to hold said shutter in retracted position, said operator controlled means including means to operate said latch when the shutter is fully retracted and means to release said latch during the lamp retraction cycle to permit moving the shutter to closed position.

5. A rectractable lamp mounting for vehicles comprising a support having an opening therein, a rectilinear guide fixedly mounted on the support at the rear of said opening and extending toward said opening, a lamp, means for mounting the lamp for sliding movement along said guide toward or from sealing engagement with the opening, a shutter, means pivotally mounting the shutter on the support for movement toward or from the opening at an angle to the path of movement of the lamp to cover or uncover the opening, and unitary operator-controlled means for moving the lamp and shutter in sequence to swing the shutter away from the opening and move the lamp into the opening or to move the lamp away from the opening and swing the shutter into closing position.

6. In the combination as defined in claim 5, said last-named means comprising a rotatable drum having cam tracks thereon and cam followers engaged with said tracks and connected respectively to the lamp and to the shutter.

7. A retractable lamp mounting for vehicles comprising a support having an opening therein, a lamp, means for movably mounting the lamp to enable it to be positioned in sealing engagement with said opening or withdrawn rearwardly therefrom, a plurality of pivoted closures adapted to cooperate in one position to close said opening and in another position to lie out of line with said opening, and operator-controlled means operating in sequence to withdraw said lamp from sealing engagement with said opening and swing said closures over said opening or to swing said closures away from said opening and advance said lamp into sealing engagement with said opening.

8. In the combination as defined in claim 7, means for latching said closures in inoperative position, and means actuated by said operator-controlled means for unlatching said closures prior to swinging them into position over said opening and latching said closures upon reaching retracted position.

JOHN S. PARKES.